United States Patent [19]

Ueno et al.

[11] Patent Number: 4,735,352

[45] Date of Patent: Apr. 5, 1988

[54] PIN TRACTOR

[75] Inventors: Toshihiko Ueno, Kobe; Hiroshi Daini, Akashi, both of Japan

[73] Assignee: Bando Chemical Industries, Ltd., Hyogo, Japan

[21] Appl. No.: 940,327

[22] Filed: Dec. 11, 1986

[30] Foreign Application Priority Data

Dec. 16, 1985 [JP] Japan .......................... 60-193698[U]
Dec. 16, 1985 [JP] Japan .......................... 60-193699[U]
Dec. 24, 1985 [JP] Japan .......................... 60-201644[U]

[51] Int. Cl.[4] .............................................. G03B 1/22
[52] U.S. Cl. ..................................................... 226/74
[58] Field of Search ...................... 226/74, 75, 76, 79, 226/170; 400/616, 616.1, 616.2

[56] References Cited

U.S. PATENT DOCUMENTS

| | | | |
|---|---|---|---|
| 4,130,230 | 12/1978 | Seitz | 226/75 |
| 4,199,091 | 4/1980 | Hubbard | 226/74 |
| 4,214,691 | 7/1970 | Van Namen | 226/74 |
| 4,315,585 | 2/1982 | Seitz | 226/74 |
| 4,421,261 | 12/1983 | Hubbard | 226/74 |
| 4,569,468 | 2/1986 | Neer | 226/74 |
| 4,614,287 | 9/1986 | Ueno et al. | 226/74 |

FOREIGN PATENT DOCUMENTS

| | | |
|---|---|---|
| 57-135537 | 4/1982 | Japan . |
| 57-17434 | 8/1982 | Japan . |

*Primary Examiner*—Stuart S. Levy
*Assistant Examiner*—Lynn M. Sohacki
*Attorney, Agent, or Firm*—Armstrong, Nikaido, Marmelstein & Kubovcik

[57] ABSTRACT

Pin tractors for feeding blank paper in various printers, typewriters, etc. for use as output devices for electronic computers, especially for personal computers. A belt carrying pins is wound rotatably around a driving toothed pulley and a driven pulley. A driven pulley is fitted rotatably to a cylindrical part of a fixing member composing a lock means to fix a frame to a guide shaft or to a tubular part of a revolving member.

14 Claims, 6 Drawing Sheets

PIN TRACTOR

BACKGROUND OF THE INVENTION

1. Field of the invention

This invention relates to a pin tractor for feeding blank paper for use in various printers, typewriters, etc., which are used as output devices for electronic computers, especially for personal computers.

2. Description of the prior art

In various printers, typewriters, etc. to be used as output devices for electronic computers, etc., pin tractors which feed blank paper by engaging pins of an endless belt carrying pins with feed perforations at both edges of blank paper and by running the endless belt carrying pins, are generally used. Methods of driving the belt carrying pins of such pin tractors are roughly divided into:

(i) the driving is effected by a driving toothed pulley and a driven toothed pulley (or flat pulley), as disclosed by U.S. Pat. No. 4,130,230, for example, and (ii) the driving is effected by a driving toothed pulley and a guide part having a semicircular portion, as disclosed by U.S. Pat. No. 4,315,585 and Japanese Utility Model Registration Application Laying Open Gazette No. 57-135537.

However, according to the driving method of item (i) above, a driving torque (turning torque) of the belt carrying pins becomes small but the measurement of the pin tractor as a whole becomes larger, due mainly to the space required for the arrangement of a fixing mechanism which fixes a pin tractor to a guide shaft. Thus, compactness of the pin tractor cannot be expected from this method.

According to the driving method of item (ii) above, the pin tractor as a whole can be compacted to some extent but turning torque of the belt carrying pins becomes larger, for which it is necessary to make the driving load of the belt carrying pins larger.

With the recent development of miniaturization of printers, etc. and the resultant space saving, miniaturization of pin tractors has been demanded. It has also been desired in the field of printers to lessen the turning torque of the belt carrying pins from the aspect of saving power consumption. For example, as disclosed by U.S. Pat. No. 3,825,162, it has been known to form a teeth portion of the belt carrying pins in semispherical shape but even with this, turning torque could not be reduced to the desired degree. In such conventional pin tractors, the belt carrying pins is mounted rather loosely so as to reduce the turning torque of the driving pulley and is adapted to run straight in a guide groove of open cut shape (refer to U.S. Pat. No. 3,825,162, for example). However, since the guide groove has guide surfaces close to both side edges of the belt carrying pins and the belt carrying pins runs in such a fashion that the blank paper feeding surface of the belt (surface of the belt base) becomes almost the same level with the surface of the frame, blank paper feeding load occurs due to the slide resistance between blank paper (at feeding) and the surface of the frame, with resultant lowering of blank paper feeding function. This tendency is especially conspicuous in the case of blank paper of rough quality. Also, if the belt carrying pins is loose, when blank paper is fed by feeding at a loose side of the belt, the belt rises up considerably and as a result, accuracy of paper feeding lowers.

As disclosed by U.S. Pat. No. 4,214,691 and Japanese Patent Application Publication Gazette No. 57-17434, for examples, the conventional pin tractor is so designed that it is supported movably by a guide shaft and a driving shaft and is adjustable in position according to the width of paper to be fed. A lock means is provided so that the pin tractor can be fixed at the desired position in relation to the guide shaft.

In the conventional lock means mentioned above, fixing to and releasing from the guide shaft depend upon the revolving direction of an operational lever and therefore it is necessary to revolve the operational lever in the same direction at all times for fixing the pin tractor to the guide shaft. In view of this necessity, different pin tractors are used to the left side and to the right side of paper. This poses a problem involving the requirement of more parts and higher manufacturing costs. In this connection, a lock means which can carry out fixing to and releasing from the guide shaft, irrespective of the revolving direction of the operational lever in relation to the fixing member, is available (U.S. Pat. No. 4,614,287, for example) but as this lock means comprises a fixing member and an operational lever, it costs higher from the standpoint of formation of parts and more processes for construction.

SUMMARY OF THE INVENTION

The present invention has for its object to lessen the turning torque of the belt carrying pins in the pin tractor comprising a frame supported movably by a guide shaft, a lock means to lock said frame to the guide shaft, a driving toothed pulley and a driven pulley provided on said frame and a belt carrying pins wound around said two pulleys.

For attaining the above object, the lock means according to the present invention comprises a fixing member with a cylindrical part which is provided at said frame and through which the guide shaft is put and a lever member which is fitted revolvably to the cylindrical part of the fixing member and presses the cylindrical part against the guide shaft by its revolution, and a driving pulley is fitted rotatably to the cylindrical part of the fixing member. In this case, it is desirable that the frame is so designed that it has a guide part and an engaging groove is formed along the belt running direction and at a linear portion of the guide part so that the engaging groove engages with a teeth part of the belt carrying pins and guides the teeth part to move in the belt running direction.

Another object of the present invention is to provide pin tractors which are equipped with less parts, are simple in construction and are cheap in cost.

In order to attain the above another object, in the present invention the lock means comprises a fitting hole of a modified inside diameter and a revolving member having a tubular part which is put in said fitting hole and through which the guide shaft is put, and a driven pulley is fitted rotatably to the tubular part of the revolving member.

The foregoing and other objects of the present invention and novel features of the present invention will be more apparent from the following description made with reference to the accompanying drawings.

BRIEF DESCRIPTION OF THE DRAWINGS

The accompanying drawings show preferred embodiments of the present invention, in which.

DETAILED DESCRIPTION OF THE INVENTION

Figure 1:
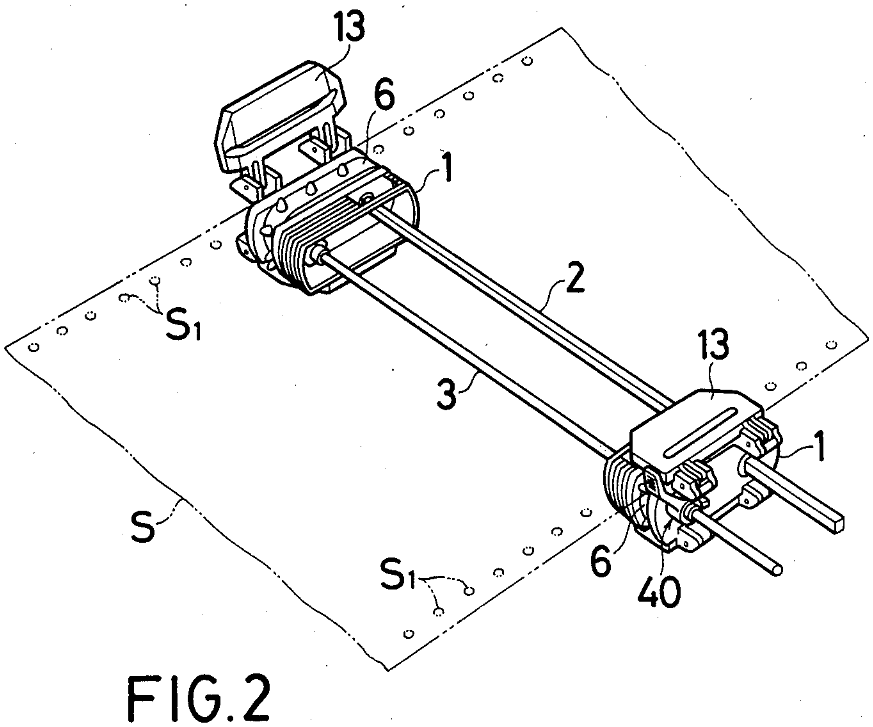
FIG. 1 is a perspective view of a blank paper feeding device using a pin tractor.

In the pin tractor shown in FIG. 1, the reference numerals 1 designate a pair of pin tractors which are arranged with a space corresponding to the width of blank paper S between them. A driving shaft 2, square in cross section, and a guide shaft 3, circular in cross section, which are substantially in parallel with each other are put through both pin tractors.

Each of the pin tractors has a belt 6 carrying a plurality of pins 4 engagable with feed perforations $S_1$ provided at both edges of a continuous paper form S and projecting from the surface of the belt base at regular intervals, and a plurality of teeth 5 at the back side of the belt base. By the turning drive of the belt 6 carrying pins, the blank paper S is fed at a substantially specified speed. The teeth part 5 of the belt 6 is linked with the driving shaft 2 and engages with a driving toothed pulley 7 which is fixed only in circumferential direction and a driven flat pulley 8, whereby the belt 6 carrying pins is driven to turn.

Figure 2:
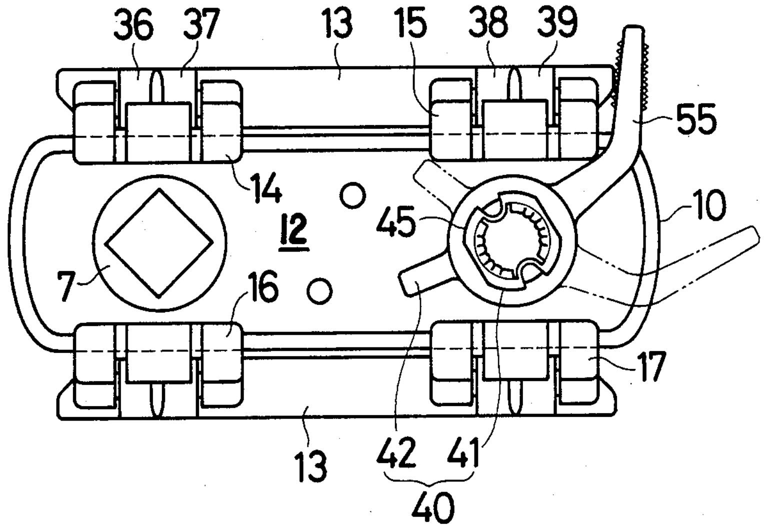
FIG. 2, FIG. 3 and FIG. 4 are a front view, a plan view and a side view of partial cross section respectively of the pin tractor.
Figure 3:
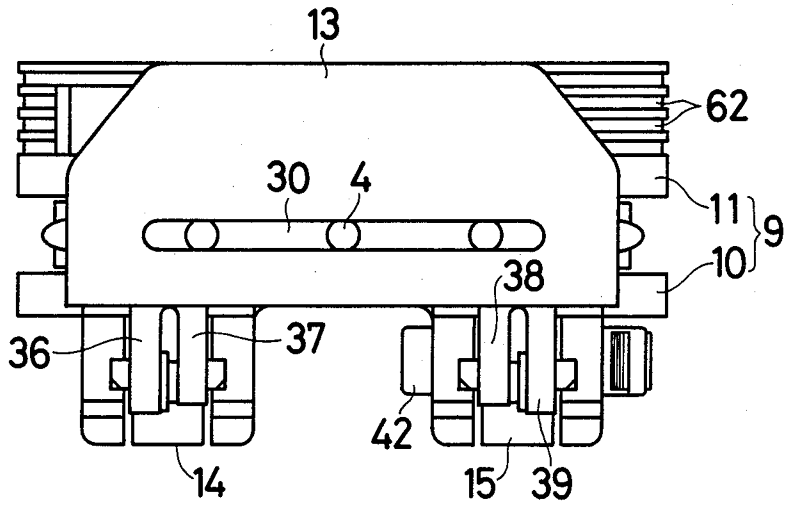
Figure 4:
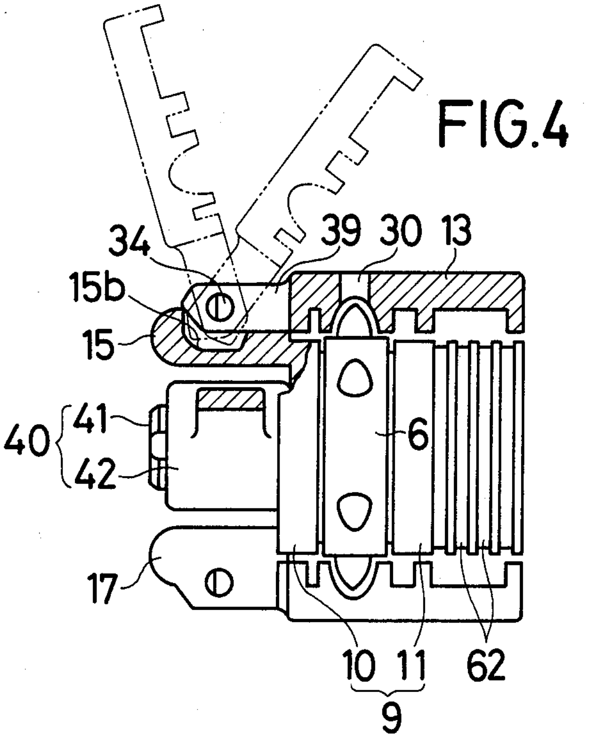

A frame 9 of the pin tractor 1 is made of synthetic resin and comprises a frame proper 10 and a guide frame 11 fixed in said frame proper 9, as shown in FIG. 2–FIG. 4.

Figure 5:
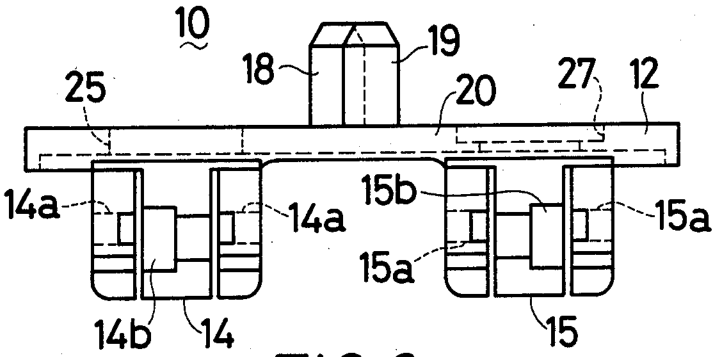
FIG. 5 is a plan view of a frame proper.

As shown in FIG. 2 and FIG. 5, the frame proper 10 has a base plate part 12 of substantially rectangular shape. At the four corners of the base plate part 12 are provided supports projecting to one side 14, 15, 16, 17 to which presser plates 13, 13 made of synthetic resin are pivotted and engagng pins 18, 19 are formed projecting to the other side. Blank paper S engaging with the belt 6 carrying pins is supported between the frame 9 and the presser member 13.

Figure 6:
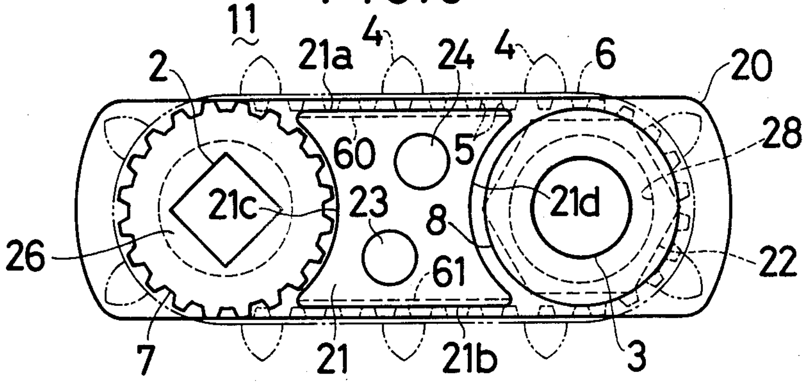
FIG. 6 shows the relation between a guide frame and a pulley.
Figure 7:
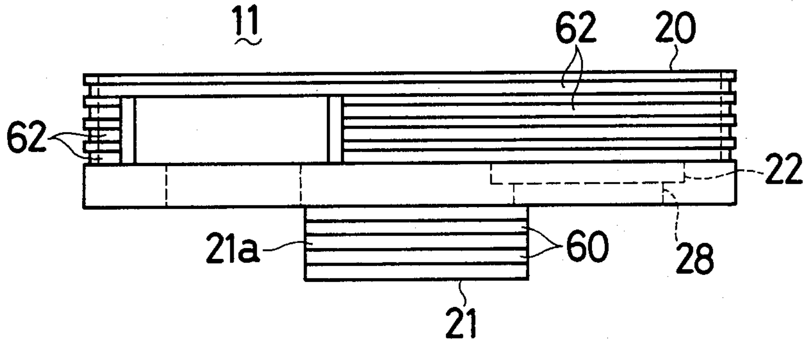
FIG. 7 and FIG. 8 are a plan view and a side view respectively of the guide frame.
Figure 8:
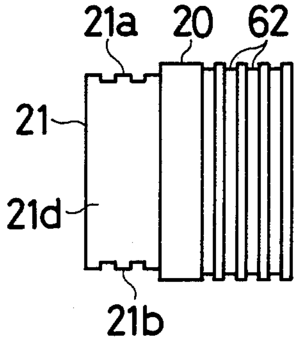
Figure 9:
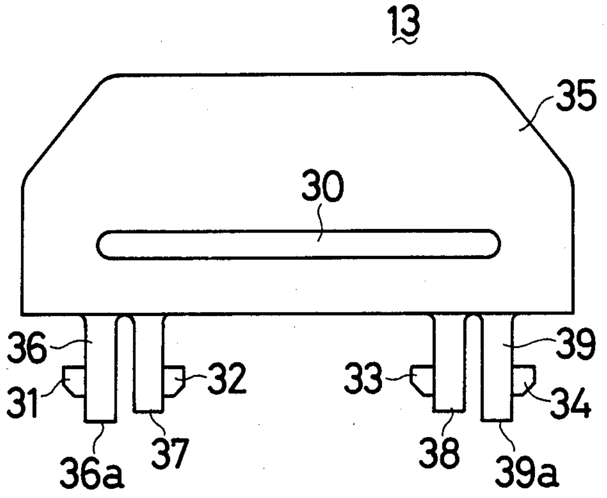
FIG. 9 is a plan view of a presser member.
Figure 10:
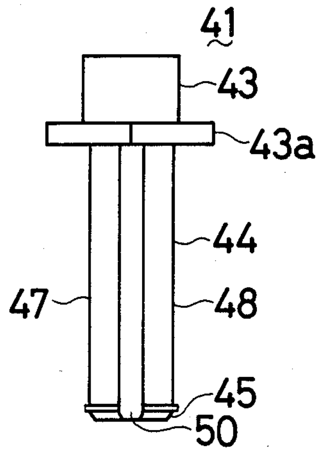
FIG. 10 and FIG. 11 are a side view and a bottom view respectively of a fixing member.
Figure 12:
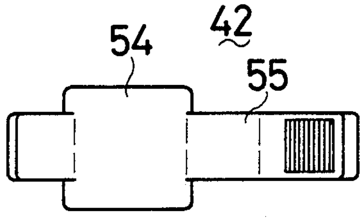
FIG. 12 and FIG. 13 are a side view and a plan view respectively of a lever member.
Figure 11:
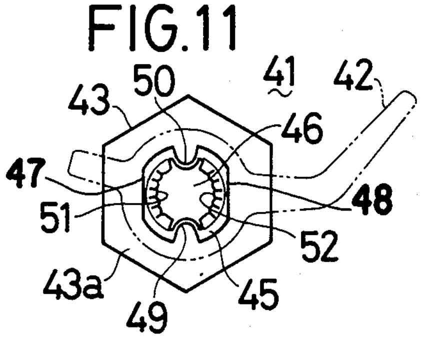
Figure 13:
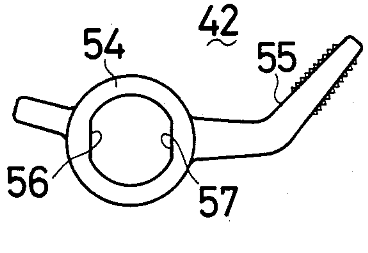

As shown in FIG. 6–FIG. 8, a guide frame 11 has a hollow base part 20. Provided at one side of the hollow base part 20 is a guide part 21 having two guide surfaces 21*a*, 21*b* and two curved surfaces 21*c*, 21*d* at the central part thereof and provided in a hollow part at the other side is a concaved part 22 of hexagonal shape to which a lock means 40 (to be described later) is fitted.

Fitting holes 23, 24 are made through the base part 20 of the guide frame 11 and the guide part 21. Engaging pins 18, 19 are fitted in said fitting holes 23, 24, whereby the frame proper 10 and the guide frame 11 are connected integrally, with the guide part 21 contacting the frame proper 10.

Provided at the guide surfaces 21*a*, 21*b* are a plurality of parallel grooves 60, 61 which are along the belt running direction, whereby the contact area between the guide surfaces 21*a*, 21*b* and the teeth part 5 of the belt 6 carrying pins is made less than 60% of that in the case of the whole surface contact. A plurality of grooves 62 which are in parallel with the parallel grooves 60, 61 are provided at the surface of the base part 20, whereby the contract area of blank paper S becomes smaller and consequently the feeding load becomes smaller.

The driving pulley 7 which is fitted to the driving shaft 2 and turns integrally with the latter is rotatably supported by driving shaft 7 within a hole 25 of the frame proper 10 and a hole 26 of the guide frame 11. The guide shaft 3 is rotatably and slidably received through holes 27 and 28 of frames 10 and 11 respectively, and a lock means 40.

The presser member 13 has a slit 30 made at the position corresponding to the moving path of the belt 6 carrying pins and also axis parts 31, 32, 33, 34 which engage with engaging holes 14*a*, 15*a* of the support parts 14, 15 (or 16, 17) of the frame proper 10. Axis parts 31, 32, 33, 34 are projected from arm parts 36, 37, 38, 39 in the same direction. Arm parts 36, 39 at the outer side are longer than the arm parts 37, 38 at the inner side and top parts (as pawl parts) 36*a*, 39*a* engage elastically with concaves 14*b*, 15*b* and hold the presser member 13 at the specified opened degree. The axis parts 31, 33 and the axis parts 32, 24 project in opposite direction respectively.

The lock means 40 which fixes the pin tractor 1 to the guide shaft 3 has a tubular fixing member 41 fitted to the guide shaft 3 provided at the frame proper 9 and a lever member 42 fitted movably to said fixing member 41, as shown in FIG. 10–FIG. 13.

The fixing member 41 carries a base part 43 having a base plate 43*a* of hexagonal pillar shape, a tubular part 44 which is connected to said base part 43 and to which a driven flat pulley 8 is fitted and a flange part 45 for anti-slipping connected to said tubular part 44. A throughhole 46 through which the guide shaft 3 is put is made through the base part 43 and the tubular part 44. The tubular part 44 and the flange part 45 are provided with flat surfaces 47, 48, back to back, in axial direction and thin parts at the bottom of grooves 49, 50 which are transformable inwardly are formed at the position about 90° shifted in circumferential direction from the flat surfaces 47, 48.

A lever member 42 comprises a tubular part 54 having an inside diameter which is substantially the same as the outside diameter of the cylindrical part 44 and a lever part 55 which is connected to the tubular part 54 and extends in radial direction. Provided at the inner peripheral surface of the tubular part 54 are control surfaces 56, 57 which make the inside diameter smaller.

In the lock means 40 composed as above, when the lever member 42 revolves in one direction and the control surfaces 56, 57 disengage from the flat surfaces 47, 48 of the cylindrical part 44 in the fixing member 41 and ride on the circumferential surface, the cylindrical part 44 deforms in such a fashion that it makes the inside diameter of the through-hole 46 smaller and consequently is pressed by and tightens the guide shaft 3, whereupon the pin tractor is fixed immovably in relation to the guide shaft 3. At this time, thin parts 49, 50 transform in such a fashion that they project inwardly in radial direction and are pressed by the guide shaft 3. Since many ruggednesses 51, 52 extending in axial direction are formed at the inner surface of the through-hole 46, it improves tightening force still further.

In the above fixed condition of the pin tractor 1, if the lever member 42 is revolved in one direction and the control surfaces 56, 57 are engaged with the flat surfaces 47, 48 of the cylindrical part 44, fixing of the pin tractor 1 to the guide shaft 3 is released and accordingly the pin tractor 1 is made movable along the guide shaft 3.

Since the pin tractor according to the present invention is constructed as described above and has the belt 6 carrying pins wound around the driving toothed pulley 7 and the driven flat pulley 8 for turning by driving, it can make the turning torque smaller than in the case of the conventional construction, such as forming the teeth part in semispherical shape in view of rolling friction by the driven flat pulley 8.

Figure 14:
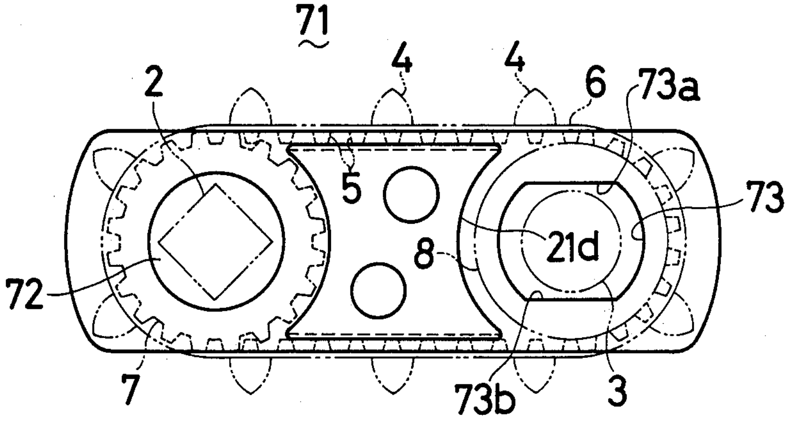
FIG. 14 is a front view of a guide frame of another embodiment.
Figure 15:
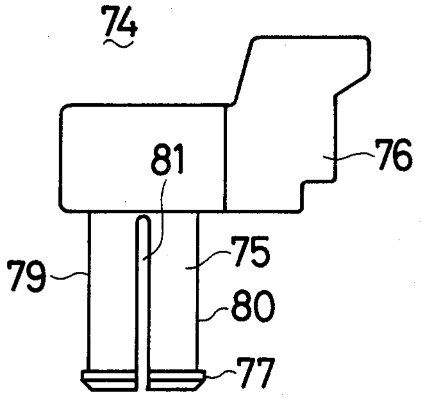
FIG. 15 and FIG. 16 are a side view and a bottom view partly in section of a revolving member.
Figure 16:
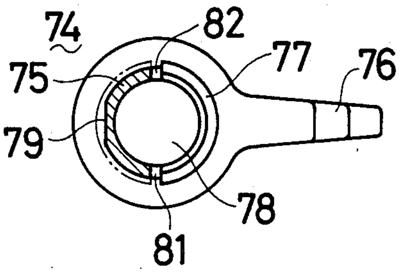

Furthermore, since the pin tractor 1 according to the present invention uses the cylindrical part 44 of the fixing member 41 which composes the lock means 40 as an axis of rotation of the driven flat pulley 8, compactness of the pin tractor is made possible. In order to make the turning torque of the belt carrying pins smaller and to decrease the number of parts of the lock means, the guide frame and the revoling member may be composed as shown in FIG. 14–FIG. 16. Similarly to those shown in FIG. 1–FIG. 13, the driving toothed pulley 7 which is fitted to the driving shaft 2 and turns integrally with the driving shaft is supported rotatably in an opening of the frame proper and an opening 72 of a guide frame 71, and the guide shaft 3 is put through the other opening 73 (only the opening 73 of the guide frame 71 is shown in the drawing) through the medium of a revolving member 74 which composes a lock means to be described later. The opening 73 has at its inner circumferential surface control surfaces *73a*, *73b* (flat surfaces) for making the inside diameter smaller which are opposed to and in parallel with each other.

As shown in FIG. 14, FIG. 15 and FIG. 16, the lock means which fixes the pin tractor to the guide shaft 3 is composed by the opening (fitting hole) 73 which is provided in the guide frame 71 and has a modified inside diameter (the inside diameter varies in circumferential direction) and the revolving member 74 which is put through the opening 73 revolvably.

The revolving member 74 has a tubular part 75 to which the driven flat pulley 8 is fitted rotatably. A lever part 76 is provided at one end of the tubular part 75 and a flange 77 for anti-slipping is provided at the other end. A through-hole 78 through which the guide shaft 3 is put is made. The tubular part 75 is provided with flat surfaces 79, 80, back to back, in axial direction and linear slits 81, 82 are formed at the tubular part 75 and the flange part 77 respectively, at the position about 90° shifted in circumferential direction from the flat surfaces 79, 80.

In the lock means composed as described above, when the revolving member 74 revoves in one direction and the flat surfaces 79, 80 of the tubular part 75 disengages from the control surfaces *73a*, *73b* at the fitting hole 73, and the curved surface of the tubular part 75 is controlled by the control surfaces *73a*, *73b*, the tubular part 75 deforms in such a fashion that it makes the inside diameter of the through-hole 78 smaller through the medium of the slits 81, 82, whereby the guide shaft 3 is tightened and consequently the pin tractor is fixed immovably in relation to the guide shaft 3.

In the above fixed condition of the pin tractor 1, if the revolving member 74 is revolved in reverse direction to engage the flat surfaces 79, 80 of the tubular part with the control surfaces *73a*, *73b*, fixing of the pin tractor 1 to the guide shaft 3 is released and accordingly the pin tractor 1 is made movable along the guide shaft 3.

Figure 17:
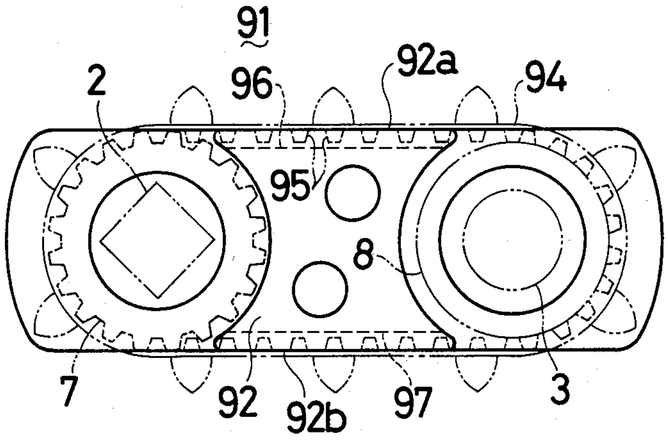
FIG. 17 is a side view of another guide frame.
Figure 18:
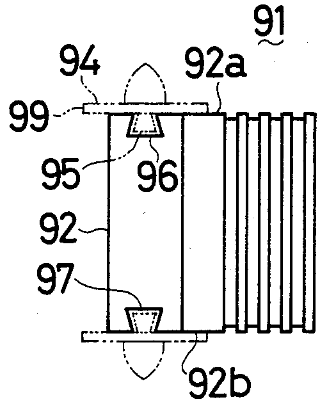
FIG. 18 is a front view of the guide frame.

In the above embodiment, the linear slits 81, 82 are formed at the tubular part 75 of the revolving member 72 so that the guide shaft can be tightened and fixed but the slit can be of spiral shape, instead of linear shape, or can be substituted by a thin part. The opening 73 may be in any shape of modified inside diameter, so long as the inside diameter of the through-hole 78 can be varied by the revolution of the revolving member 74. Alternatively, the composition as shown in FIG. 17 and FIG. 18 can be adopted, namely, guide grooves 96, 97 of trapezoidal shape corresponding to a teeth part 95 of a belt 94 carrying pins are provided in the belt running direction at the guide surface formed at a guide part 92 of a guide frame 91. The teeth part 95 of the belt 94 carrying pins engages with the guide grooves 96, 97. The guide groove may be formed after a frame proper 90 was connected to the guide frame 91.

In the above composition, it is possible to make a belt base 99 of the belt 94 carrying pins which composes the blank paper feeding surface larger in width than the teeth part 95 and to increase the blank paper transporting ability. Moreover, the upper surfaces of the frame proper 90 and the guide frame 91 are substantially on the same level when they are in the connected condition, without the guide surface as in the conventional pin tractor, and are almost free from the frictional resistance with blank paper. Thus, feeding load of blank paper is small and blank paper feeding accuracy is high.

The guide grooves 96, 97 with which the teeth part 95 of the belt 94 carrying pins engage are trapezoidal in cross section to correspond to the teeth part 95 and therefore the pin tractor 94 carrying pins is free from disengagement from the upper surfaces *92a*, *92b* of the guide part 92 or at the linear portion and is guided only in the belt running direction. Therefore, meandering of the belt 94 carrying pins and rising up of the belt 94 carrying pins at the belt slacking side can be prevented, with the result of high blank paper feeding accuracy. The tooth skip at the driving toothed pulley due to rising up of the belt in the case of the belt slacking side feeding can be prevented.

Figure 19:
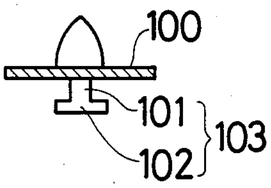
FIG. 19 through FIG. 21 are cross sectional views of modified examples of the belt carrying pins.
Figure 20:
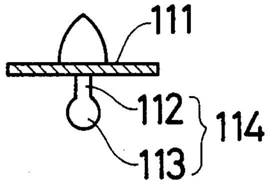
Figure 21:
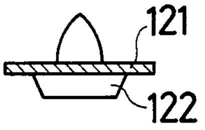

In the above embodiment, the teeth part 95 of the belt 94 carrying pins and the engaging grooves 96, 97 are trapezoidal in cross section but the teeth part of the belt carrying pins can be a teeth part 103, as shown in FIG. 19, which comprises a support part 101 extending from a belt base 100 and an engaging part 102 which is larger in width than a support part 101 and is provided at the top of the support part 101. Alternatively, as shown in FIG. 20, a teeth part 114 comprising a support part 112 extending from a belt base 111 and an engaging part 113, which is circular in cross section and of larger diameter, communicating with the support part 112, may be used. Besides, a teeth part 122 of inverted-trapezoidal shape can be provided at a belt base 121.

As the present invention can be embodied in various types without departing from its substantial characteristics, the above embodiments have been given solely for explanation purposes and are not of restrictive nature. Furthermore, as the scope of the present invention is not limited by the description made preceding the claim but is limited by the scope of claim for patent, any change in the requirements of the scope of claim for patent and equivalents to such requirements are included in the scope of claim for patent.

What is claimed is:

1. A pin tractor of the type including a frame movably supported on a guide shaft and means to fix said pin tractor frame against movement relative to said guide shaft comprising: a driving toothed pulley and a driven pulley rotatably mounted to said frame, a continuous belt carrying drive pins mounted for movement around said pulleys, lock means including a hollow tubular fixing member supported by said frame and a lever member having a tubular part with an interior opening mounted to said tubular fixing member for rotary movement relative to the external surface thereof, said hollow tubular fixing member rotatably supporting said driven pulley and having diametrically opposed, axially extending flat surfaces with diametrically opposed, axially extending grooves formed in the exterior surface thereof between said axially extending flat surfaces, and said interior opening of said tubular part of said lever member having diametrically opposed, axially extending flat control surfaces, equal in number to said axially extending flat surfaces on said hollow tubular fixing member, whereby said tubular part of said lever member may be rotated relative to said hollow tubular fixing member between a position where said flat control surfaces are opposed to said flat surfaces on said hollow tubular fixing member permitting sliding movement of said pin tractor frame relative to said guide shaft and another position where said flat control surfaces oppose said grooves formed in the exterior surface of said hollow tubular fixing member and deform said grooved exterior surfaces inwardly thereby pressing the hollow interior of said tubular fixing member against said guide shaft and fixing said pin tractor frame against movement relative to said guide shaft.

2. A pin tractor as defined in claim 1, wherein said frame has at least one linear guide surface to guide said continuous belt carrying drive pins, said continuous belt has a plurality of teeth formed on a surface of said belt opposite to said drive pins, an engaging groove formed in said linear guide surface and extending along the belt running direction, and said plurality of teeth on said belt are engaged with and guided by said groove in the belt running direction.

3. A pin tractor as defined in claim 2, wherein the cross section of said engaging groove is such that the groove is wider at the bottom than it is at said linear guide surface and said plurality of teeth have a corresponding shape to allow movement of the teeth and the belt in the belt running direction while preventing movement of the belt away from said linear guide surface.

4. A pin tractor as defined in claim 3, wherein the cross section of said engaging groove is of trapezoidal shape.

5. A pin tractor including a frame slidably supported by a guide shaft, lock means adapted to fix said frame against movement relative to said guide shaft, a driving toothed pulley and a driven toothed pulley provided at said frame and a continuous belt carrying drive pins positioned for movement around both of said pulleys, said lock means comprising a fitting hole provided to said frame and having a contour partly defined by the diameter of a circle and including at least one flat control surface and a revolving member having a tubular part with a through hole receiving said guide shaft and an outer surface including at least one axially extending flat surface, said tubular part being adapted for insertion in said fitting hole with said axially extending flat surface opposite said flat control surface, a driven pulley rotatably mounted to said outer surface of said tubular part of said revolving member, and means permitting deformation of said tubular part of said revolving member, whereby rotation of said revolving member will displace said axially extending flat surface relative to said flat control surface thereby causing said tubular part to press against said guide shaft.

6. A pin tractor as defined in claim 5, wherein said means permitting deformation of said tubular part of said revolving member is comprised of at least one discontinuity in the material forming said tubular part and said discontinuity is shaped to extend along said tubular part.

7. A pin tractor as defined in claim 6, wherein said fitting hole has a pair of diametrically opposed control surfaces and said discontinuity is comprised of at least one groove extending axially along the surface of said tubular part and providing a thin walled porton of said tubular part.

8. A pin tractor as defined in claim 6, wherein a lever part is provided at one end of said tubular part of said revolving member.

9. A pin tractor as defined in claim 8, wherein a flange for anti-slipping is formed at the end of said tubular part of said revolving member opposite from said one end.

10. A pin tractor as defined in claim 5, wherein said frame has at least one linear guide surface to guide said continuous belt carrying drive pins, said continuous belt has a plurality of teeth formed on a surface of said belt oppose to said drive pins, an engaging groove formed in said linear guide surface and extending along the belt running direction, and said plurality of teeth on said belt are engaged with and guided by said groove in the belt running direction.

11. A pin tractor including a frame slidably supported by a guide shaft, lock means to fix said frame against movement relative to said guide shaft, a driving toothed pulley provided at said frame and a continuous belt carrying drive pins positioned for movement around said driven toothed pulley, said lock means comprising a fitting hole provided to said frame and having a contour partly defined by the diameter of a circle and including at least one flat control surface and a revolving member having a tubular part with a through hole receiving said guide shaft and an outer surface including at least one axially extending flat surface, said tubular part being adapted for insertion in said fitting hole with said axially extending flat surface opposite said flat control surface and capable of deformation to press an inner surface of said through hole against said guide shaft by rotating said revolving member.

12. A pin tractor as defined in claim 11, wherein said contour of said fitting hole includes a pair of diametrically opposed flat surfaces which are substantially parallel with each other and deform diametrically opposed portions of said tubular part to press said through hole against said guide shaft.

13. A pin tractor as defined in claim 11, wherein said tubular part of said revolving member has opposing slits extending along said tubular part.

14. A pin tractor as defined in claim 11, wherein said tubular part of said revolving member has diametrically opposed axially extending grooves formed in the external surface thereof.

* * * * *